United States Patent
Bharadwaj et al.

(10) Patent No.: US 12,472,420 B2
(45) Date of Patent: *Nov. 18, 2025

(54) COMPUTERIZED METHOD FOR ANALYZING SPORT PERFORMANCE METRICS AND PROVIDING TRAINING FEEDBACK

(71) Applicant: NIKE, Inc., Beaverton, OR (US)

(72) Inventors: Sunil Bharadwaj, Portland, OR (US); John Bouck, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/543,056

(22) Filed: Dec. 18, 2023

(65) Prior Publication Data

US 2024/0115923 A1  Apr. 11, 2024

Related U.S. Application Data

(63) Continuation of application No. 17/543,145, filed on Dec. 6, 2021, now Pat. No. 11,857,860, which is a
(Continued)

(51) Int. Cl.
| | |
|---|---|
| *A63F 9/24* | (2006.01) |
| *A63B 24/00* | (2006.01) |
| *A63B 69/36* | (2006.01) |
| *A63B 71/06* | (2006.01) |
| *A63F 11/00* | (2006.01) |
| *G06F 13/00* | (2006.01) |
| *G06F 17/00* | (2019.01) |

(Continued)

(52) U.S. Cl.
CPC ...... *A63B 71/0616* (2013.01); *A63B 24/0021* (2013.01); *A63B 69/36* (2013.01); *A63B 69/3605* (2020.08); *A63B 71/0622* (2013.01); *H04M 1/72457* (2021.01); *A63B 2024/0025* (2013.01); *A63B 2220/12* (2013.01); *A63B 2220/40* (2013.01); *A63B 2225/50* (2013.01); *A63B 2225/74* (2020.08); *H04M 1/72427* (2021.01)

(58) Field of Classification Search
CPC .. G07F 17/32; G07F 17/3211; G07F 17/3214; G07F 17/3222
USPC ............. 463/1, 20, 22, 25, 30; 700/92
See application file for complete search history.

(56) References Cited

U.S. PATENT DOCUMENTS

| | | | |
|---|---|---|---|
| 2015/0242797 A1* | 8/2015 | Hoanca | G06Q 10/06398 705/7.42 |
| 2020/0111385 A1* | 4/2020 | Issa | G09B 5/02 |
| 2022/0005371 A1* | 1/2022 | Hnich | G06N 7/01 |

* cited by examiner

*Primary Examiner* — Adetokunbo O Torimiro
(74) *Attorney, Agent, or Firm* — Quinn IP Law

(57) ABSTRACT

A computer-implemented method for analyzing sport performance metrics and providing training feedback includes receiving play data for a plurality of users participating in a sporting activity; determining a statistical distribution of the performance metrics categorized by an ability level of each user; and receiving data indicating participation of the first user in the sporting activity. The server then determines a performance metric for the first user based on the received data and compares the performance metric to the statistical distribution of other users having a similar ability level as the first user. The server then identifies a deficient performance metric and transmits, to the user, a training program configured to improve the deficient performance metric.

20 Claims, 5 Drawing Sheets

Related U.S. Application Data continuation of application No. 16/686,985, filed on Nov. 18, 2019, now Pat. No. 11,192,015, which is a continuation of application No. 15/609,896, filed on May 31, 2017, now Pat. No. 10,478,704.

(60) Provisional application No. 62/356,956, filed on Jun. 30, 2016.

(51) Int. Cl.
*H04M 1/72457* (2021.01)
*H04M 1/72427* (2021.01)

COMPUTERIZED METHOD FOR ANALYZING SPORT PERFORMANCE METRICS AND PROVIDING TRAINING FEEDBACK

CROSS REFERENCE TO RELATED APPLICATIONS

This application is a continuation of U.S. application Ser. No. 17/543,145, published as US 2022/0088459, which is a continuation of U.S. application Ser. No. 16/686,985, issued as U.S. Pat. No. 11,192,015, which is a continuation of U.S. application Ser. No. 15/609,896, issued as U.S. Pat. No. 10,478,704, which claims the benefit of priority from U.S. Provisional Patent Application No. 62/356,956, filed 30 Jun. 2016, all of which are hereby incorporated by reference in their entirety.

TECHNICAL FIELD

The present invention relates generally to a multi-function digital golf assistant that may be used to facilitate score-keeping, analyze play statistics, and provide suggestions/tips for game improvement.

BACKGROUND

Golf applications for portable computing devices, such as smart phones, have historically focused on providing a user/golfer with electronic scorecard functionality and/or providing real-time range-finding capabilities. Typical electronic scorecards operate only with local input through a single interface, and are entirely populated by the user. Likewise, real-time range finding capabilities operate using a device's GPS receiver and tend to display a distance between the user's location and one or more virtual pins or way-points on the hole or course.

Current devices have not kept pace with existing trends in social media, nor have they been designed to capitalize on any benefits that may be obtained from the popularity of internet connected devices such as smart phones and smart watches. Existing devices tend to be stand-alone units that are operable only on a local, personal level.

DETAILED DESCRIPTION

Figure 1:
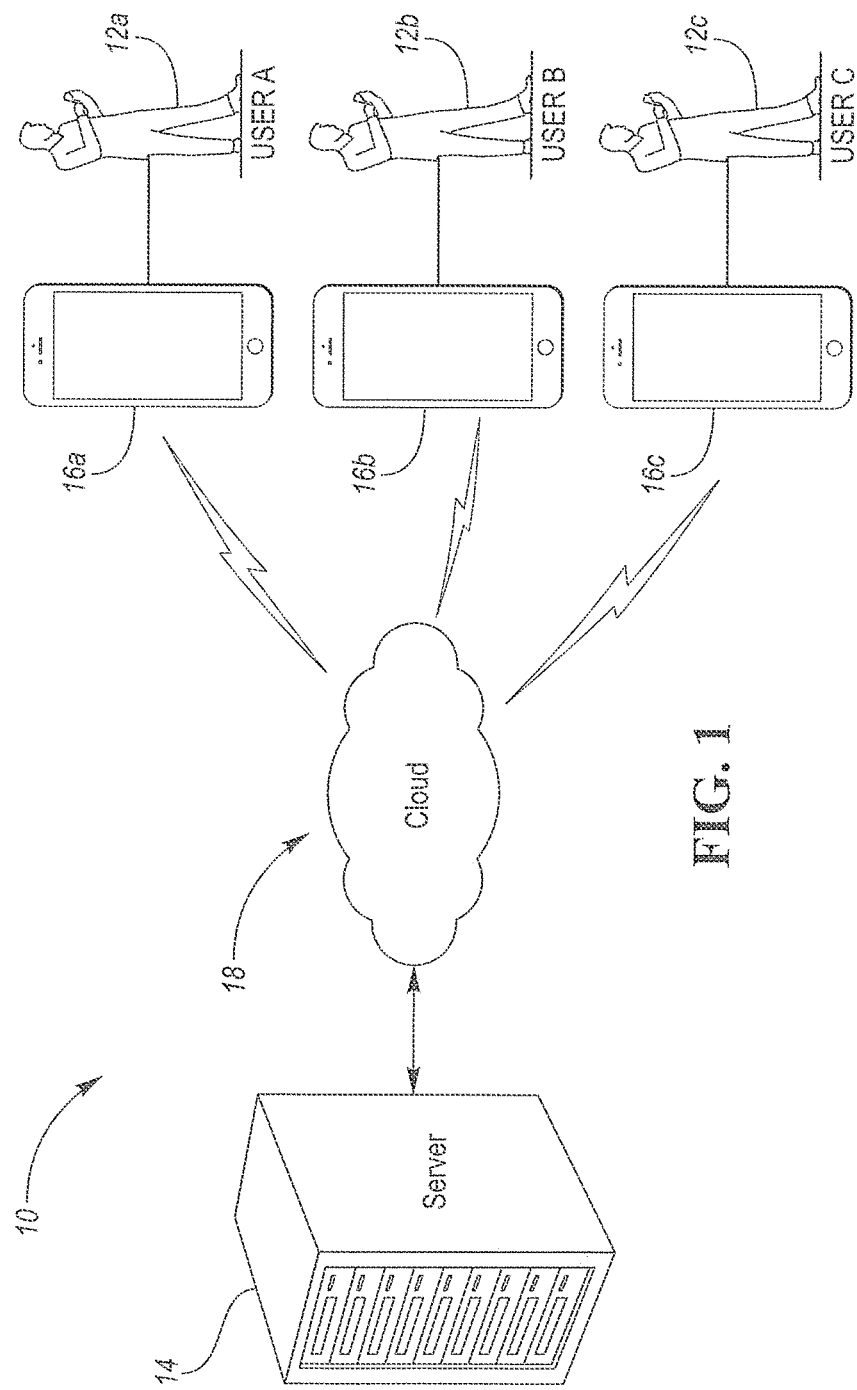
FIG. 1 is a schematic diagram of a system that provides an enhanced golf experience to a plurality of users.

Referring to the drawings, wherein like reference numerals are used to identify like or identical components in the various views, FIG. 1 schematically illustrates a system 10 that may be used to provide a user 12 with an enhanced golf experience before, during, and after a round. In particular, the system 10 may provide electronic scorecard functionality, may provide in round tips and yardages, may aggregate and summarize data relating to a golfer's ability, may provide customized pro tips for improving the golfers game, and may fully integrate with social media and/or other local golfers to share accomplishments and/or challenge community records.

The system 10 includes a centralized server 14 that is in at least periodic, bidirectional data communication with one or more portable computing devices 16 (i.e., "client devices 16") via a network 18 such as the Internet. FIG. 1 schematically illustrates a system 10 that includes three portable computing devices 16a, 16b, 16c, with each device being operated by a different respective user 12a, 12b, 12c. It should be appreciated, however, that this is purely illustrative, and the system 10 may actually operate with a near unbounded number of devices 16 and users 12.

Figure 2:
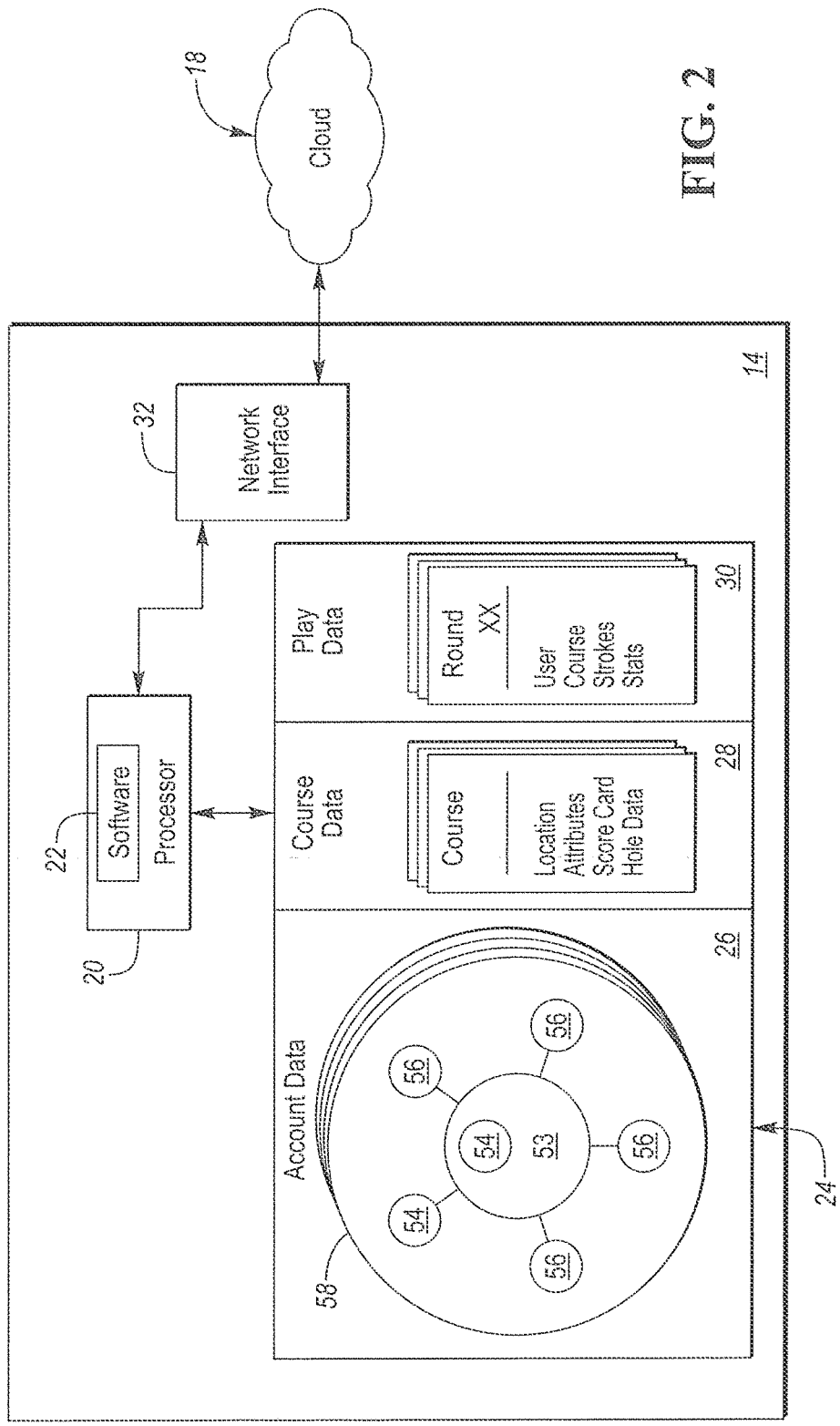
FIG. 2 is a schematic diagram of a server that is in communication with a network.

As generally illustrated in FIG. 2, the server 14 may include one or more processors 20 that are configured to execute specialized software 22 to aggregate user data and facilitate a desirable user experience via the client devices 16. More specifically, the software 22 run by the server 14 may be operative to construct and/or maintain one or more databases, stored within non-volatile memory 24, that contain user account data and preferences 26, golf course data 28, and user play data 30. The server 14 may include a network interface 32, and a means for administrative access and management such as a terminal, or direct remote login (e.g., via the network interface 32).

Figure 3:
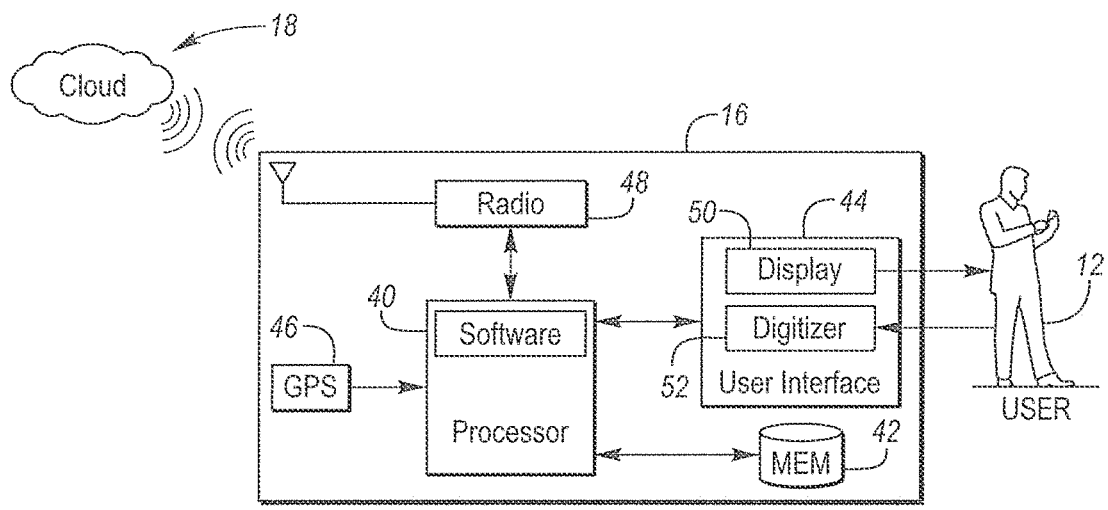
FIG. 3 is a schematic diagram of a portable computing device that is in communication with a network.

In one configuration, the portable computing ("client") device 16 may be a "smart phone"-style cellular telephone ("smart phone"), or a device with similar mobile data processing and display functionality. As generally illustrated in FIG. 3, each client device 16 may include a processor 40 in communication with non-volatile memory 42, a user interface 44, a GPS receiver 46, and a wireless radio 48 that enables two-way communication between the device 16 and the network 18 (e.g. the internet or a cellular telephone network).

In one configuration, the user interface 44 may be, for example, a capacitive touch screen display that includes both a visual display 50 and a touch-based input digitizer 52. The visual display 50 may be a liquid crystal display (LCD), a light emitting diode display (LED), an organic light emitting diode display (OLED) and/or any similar style display/monitor that can receive a visual data stream from the processor 40 and display it in a visual manner to the user 12.

In both the server 14 and the client device 16, each processor 20, 40 may be embodied as one or more distinct data processing devices, each having one or more micro-controllers or central processing units (CPU), read only memory (ROM), random access memory (RAM), electrically-erasable programmable read only memory (EEPROM), a high-speed clock, input/output (I/O) circuitry, and/or any other circuitry that may be required to perform the functions described herein.

Additionally, the non-volatile memory 24, 42 may include one or more magnetic or solid-state hard drives, solid-state flash memory, or any other similar form of long-term, non-volatile memory that may be used to store program data, user data, course data, software application algorithms, and the like.

The present system 10 may merge aspects of social media with the game of golf in a manner that enables a user to challenge and compete with friends, share course tips and accomplishments, and gain an introspective view of one's own game by comparing his/her own statistical performance with aggregated performance data from golfers across the network 18 with a similar ability level.

Referring to FIG. 2, to facilitate the social media aspects of the present system 10, the server 14 is configured to maintain account data 26 identifying the existence and preferences of each of the plurality of users 12. More specifically, the account data 26 identifies each user 12 by an account record 53, which details the user's preferences 54, and identifies other users 56 that are connected with that user 12 to define a social network 58.

In addition to account data 26, the server 14 may maintain golf course data 28 that includes a listing of all courses nationwide, with each course record providing, for example, a geocoded location for the course, one or more course attributes (cost, slope, rating, etc), scorecard data (yardages, par, handicap, hole tips), and geocoded hole-by-hole data/locations. Finally, the server may maintain user play data 30 that includes stored play/round data that is indexed to both user account data 26 and to golf course data 28, as well as being date stamped.

Figure 4:
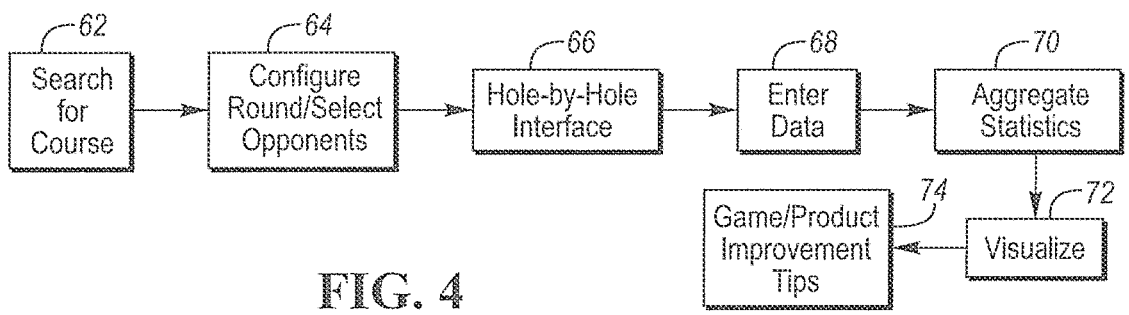
FIG. 4 is a schematic flow diagram illustrating a method of using a digital system for providing an enhanced golf experience.

FIG. 4 schematically illustrates a method 60 that may be performed in whole or in part by the system 10, or in conjunction with the system 14, at the direction of a user 12. While the method 60 generally illustrates several aspects of the system 10, it should be understood that each aspect may have its own standalone utility, independent of the other described aspects.

Figure 5:
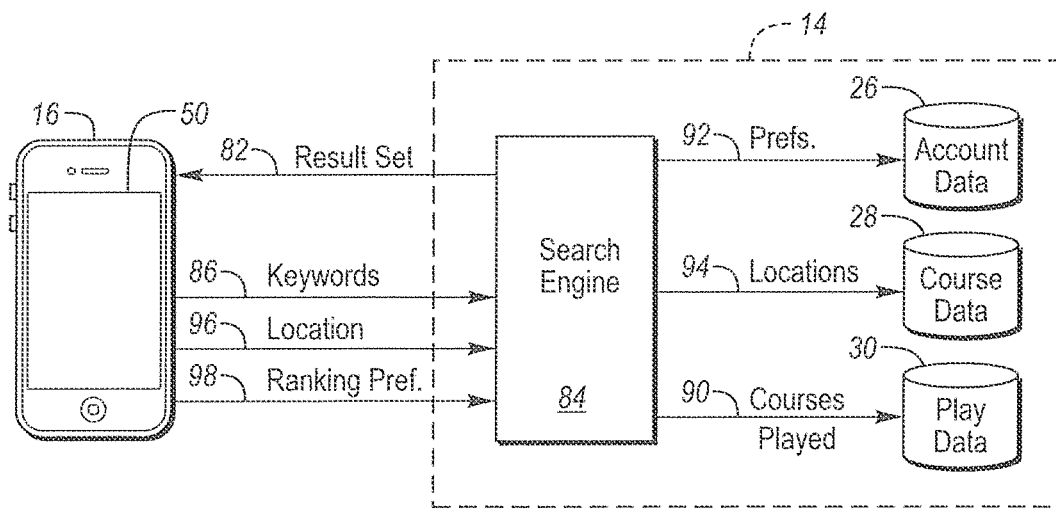
FIG. 5 is a schematic system diagram of a multi-factor golf course searching tool.

The method 60 generally begins at 62, when a user 12 interfaces with the portable computing device 16 to search for and/or select a golf course that he or she intends to play. As shown schematically in FIG. 5, the searching functionality 80 may employ a multifactor approach to provide the user 12 with a prioritized listing of courses (i.e., the "result set 82") that may be displayed via the display 50, and that attempt to anticipate a desired course selection and/or suggest courses that may be desirable to the user 12.

The course searching may generally be performed at the server 14 via a search engine 84 that is in digital communication with one or more of the user account data and preferences 26, the golf course data 28, the user play data 30, and the client device 16 (i.e., via the network 18). Prior to the user 12 entering any search terms or keywords 86, the search engine 84 may generate an initial result set 82 according to one or more of the following: past courses played 90; player preferences 92 (e.g., cost, availability, favorites); location of golf courses 94; current user location 96 (as determined by the GPS receiver 46); and any user-provided ranking preferences/biasing 98 (e.g., instructions to sort courses by distance).

In one example of a pre-search, the search engine 84 may use past courses played 90 to weight courses that the user has repeatedly played (and/or courses with similar attributes to those repeatedly played) higher than those which have been either infrequently played or are markedly different from courses that are typically played. Likewise, in an example, current location 96 and player preferences 92, such as desired cost range, may be used together with the geo-located golf course data 94 to further weight the result set 82 that is passed to the user 12. By using this multi-factored/weighted search approach, the user 12 may initially be presented with a listing of courses that have the highest potential relevance (e.g., by location and/or preference) at that moment and for the user's current location.

Following any initial presentation of weighted search results 82, the user 12 may enter one or more keywords 86 that may be used in a fuzzy-logic searching algorithm to adjust the weighting of courses returned by the search engine 84 via the result set 82. Using this approach, for example, following entry of the keyword 86, the search engine 84 may give a stronger preference to course names or locations matching or resembling the entered keyword 86. Following the entry of one or more keywords 86, the search engine 84 may update the search results 82 provided to the client device 16.

Figure 6:
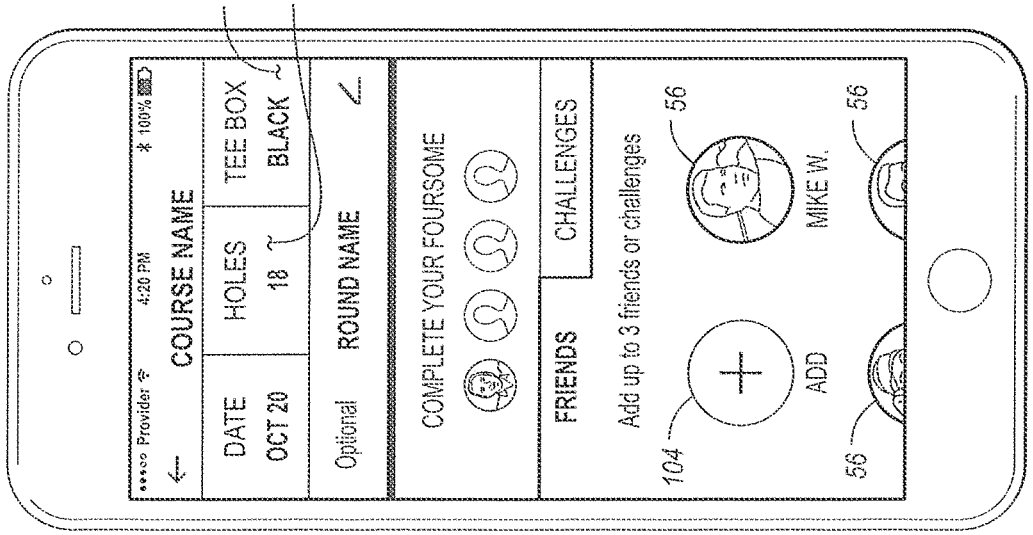
FIG. 6 is a schematic display, provided via a personal computing device, to configure a round and select one or more opponents.

Referring again to FIG. 4, after a user 12 searches for, and selects a golf course that he or she wishes to play at 62, the course data record relating to the selected course may be transmitted to the user's client device 16. The user 12 may then be prompted to configure the round and select one or more opponents at 64. Configuring the round may include selecting the number of holes to be played 100 and tee position/difficulty 102, such as shown in FIG. 6. When selecting the one or more opponents, the user 12 may have the option of locally entering the names and data for one or more real-time playing partners (e.g., via an "add" button, such as shown at 104), linking with one or more networked opponents or playing partners 56 via the server 14, or selecting one or more virtual opponents or previously recorded rounds.

In an embodiment where the user 12 desires to link with one or more networked opponents via the server 14 (i.e., after the round is initialized), the user 12 may interface with the server 14 to locate and select a digital account or profile of a linked user 56 within the current user's social network 58 or local community. Selecting the account or profile, the user 12 may cause a digital message/invitation to be emailed or pushed to a device 16 associated with the linked user 56. The invitation may include a link or virtual button that, when clicked, confirms the linked user's intention to join the round and auto populates electronic scorecard info within client devices 16 belonging to one or both of the user 12 and linked opponent 56. In a scenario where a desired playing partner is not part of a user's social network 58, an option to join the social network 58 may be provided prior to establishing a networked round. Once a networked opponent has confirmed, the server 14 may maintain a record of the group composition to facilitate score sharing among the players, enable a virtual leaderboard, and/or to coordinate one or more games.

Figure 7:
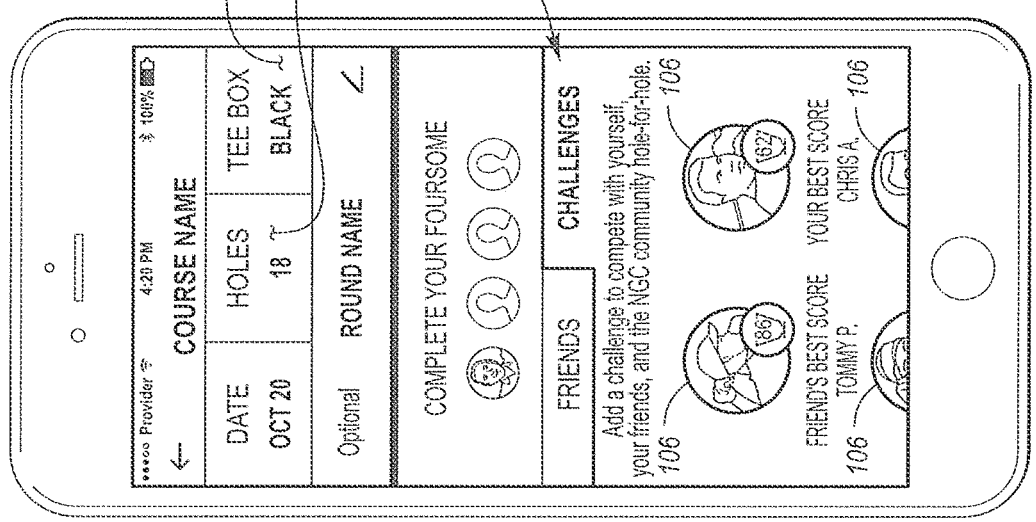
FIG. 7 is a schematic display, provided via a personal computing device, to configure a round and select one or more challenges.

In addition to playing against one or more live opponents (i.e. either locally entered or linked through a network interface), the system 10 may present the user 12 with the ability to play against one or more preselected virtual opponents or previously recorded rounds (i.e., "challenges" 106), such as generally illustrated in FIG. 7. The system 10 may construct and present a list 108 of potential challenges 106 that are deemed to be the most relevant to the user 12 based on the user's ability, chosen course, and/or social network. Potential challenges 106 may include the best score achieved on the course by the user 12, members of the user's social networks, and/or all users of the system 10 for a specified period of time (e.g., within 3 days, 1 month, 1 year, or all-time).

Figure 8:
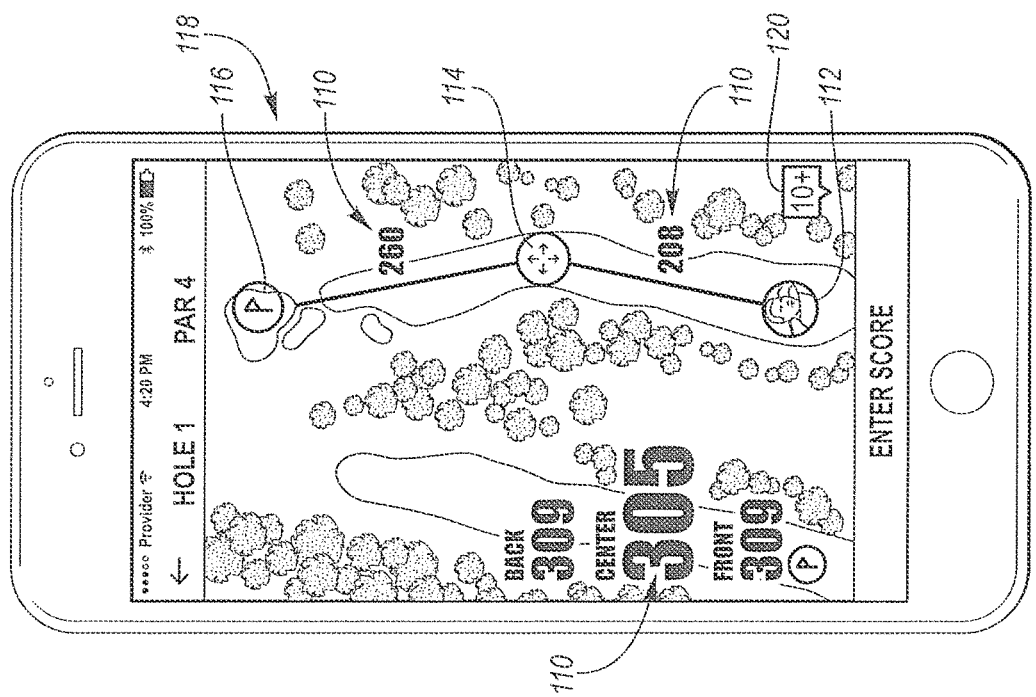
FIG. 8 is a schematic display of a hole layout, provided via a personal computing device.

Referring again to FIG. 4, once the round is initialized and all competitors are entered into the scorecard (i.e., either locally or via the network), the user 12 may begin golfing. During the round, the system 10 may display real-time distances 110 between the user's location 112 and one or more virtual targets 114 or locations 116 on the course, such as shown in FIG. 8. In one configuration, the virtual target 114 is overlaid on to a geocoded satellite image 118 of a given hole that is downloaded into the client device 16. The virtual target 114 may be dynamically repositionable by the user 12 such as by touching the display device 50/digitizer 52 with a finger, and dragging the target 114 across the screen. As the target 114 is moved, the distance 110 between the users location 112 and the target 114, as well as the distance between the target 114 and a location 116 on the course (e.g. the green/hole), may be continuously recomputed, and displayed.

In addition to providing real-time yardage information, the system 10 may also enable a user 12 to provide/receive crowd-sourced hole tips on a hole-by-hole basis. Hole tips may provide useful commentary on how to most strategically play the hole in a message board format, and may include tips on identifying targets to aim for, lies that provide easier approach shots to the green, ideal distances, or other useful information that the golfing community/social network 58 sees fit to share.

As a user approaches a tee box, or manually indexes to the next hole, the hole tips may either automatically display, or may display if a commentary menu 120 is selected via the display 50/digitizer 52. In one configuration, available tips may be separated between pro tips, and community tips. The system 10 may weight each received tip according to different classifiers, such as the ability level of the comment submitter, whether or not the submitter is a registered teaching professional, the recency of the tip, and the number of people who found the tip useful (e.g., through views and/or upvotes). Comments may be entered and aggregated at the server 14 for every hole in the database. Upon request by the user 12, a listing of hole tips may then be displayed, where higher weighted (i.e., more reputable and/or recent tips are closer to the top. Additionally, the server 14 may include a functionality for a user with administrative rights to modify or delete one or more of the tips if they are deemed inappropriate or misleading.

Referring again to FIG. 4, following each hole, or at the completion of a round, the user 12 may input his or her scores on a hole-by-hole basis at 68. In general, the data entry may include total strokes, number of putts, driving accuracy, and/or penalty strokes taken. At the completion of the round, the system 10 may used this provided data entry to compute one or more ability metrics that may include the number of fairways hit, greens in regulation, scrambling percentage, number of putts per hold/round, % one puts, etc. These statistics may be displayed for the user 12 in the moment, and/or passed to the server 14 where they may be analyzed/aggregated at 70 as user play data 30.

In one configuration, when aggregating the data at 70, the server 14 may also compute one or more statistical distributions and/or rankings for each of the determined ability metrics. In one embodiment, rather than generating the statistical distributions across golfers of all ability levels, the distributions may, instead, be separately computed for golfers of different average scores or handicaps. Said another way, the distributions may be "binned" based on ability.

Once the distributions are generated, a user's individual play data 30 may be compared with the relevant distributions to determine where each ability metric falls relative to others with the same or similar average or handicap. These comparisons may then be visualized via the display 50 at 72.

Figure 9:
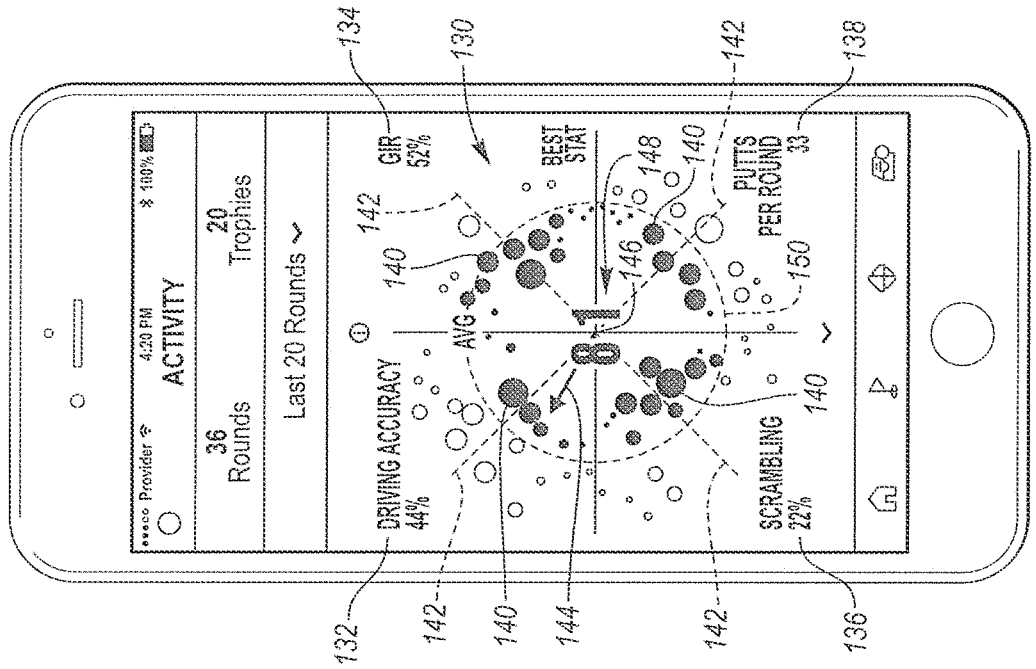
FIG. 9 is a schematic display, provided via a personal computing device, for visualizing the relative performance of a user across one or more ability metrics.

FIG. 9 illustrates a manner of visualizing/displaying the relative performance of a user 12 compared with others of similar ability. In particular, FIG. 9 illustrates a bubble plot 130 that has four quadrants, each displaying a different one of four ability metrics: driving accuracy 132, greens in regulation 134, scrambling percentage 136, and puts per round 138. In each quadrant, each bubble 140 represents a completed round of golf, with the bubbles of more recently played rounds being larger and/or closer to a 45 degree diagonal 142 than more historical rounds. The radial positioning 144 of the respective bubbles (relative to an origin 146) illustrate where the computed metric falls within the network-wide statistical distribution for golfers having similar averages 148 or handicaps. In general, the dotted circle 150 represents the mean, and bubbles within the circle 150 represent user preferences for that metric that are better than average.

With continued reference to FIG. 9, the bubble plot 130 provides a quick manner of visualizing a user's consistency across different aspects of his/her game by examining the tightness of the bubble groupings along a radial dimension/spread. Likewise, by looking at the bubble plot 130 as a whole, the user 12 can quickly identify specific aspects of his/her game that need practice and/or further improvement.

Referring again to FIG. 4, once a golfer's consistency and relative ability metrics are understood, the system 10 may be configured to provide the user 12 with tailored game improvement tips that target deficient areas as may be generally illustrated via the bubble plot 130 (at 74). These game improvement tips may include workouts, drills and/or pointers that may be performed at home on the driving range, or on the course.

In one embodiment, the determination of the one or more game improvement tips may be based off a comparison between the golfer's ability metrics and the statistical distributions of golfers within a desired average or handicap range. More specifically, the system 10 may provide feedback on which aspects of the user's game may need improvement to achieve a desired score range. This may operate by comparing the user's current metrics against averages from the desired score band. The system may identify the top one or two lowest or worst performing metrics relative to the new average, and can then provide targeted training tips, exercises, or drills to help improve the golfer's performance. In this manner, the training tips may highlight only those aspects that would best aid in reducing the user's score.

In a further extension of the present design, instead of simply relying on raw scores, the radial positioning 144 of each bubble may be normalized according to the difficulty (i.e., slope and rating) of the course and the tee location that was played to give rise to the bubble. In this manner, comparatively poor performances that are caused by playing a more difficult course may be adjusted to provide a more direct comparison with the user's performance on comparatively less challenging courses.

Referring again to FIG. 7, in addition to selecting one or more challenges 106 that consist of previously recorded rounds (i.e. rounds that were actually played by others), the system 10 may also enable a user 12 to compete against one or more purely virtual opponents as "challenges." In one embodiment, a virtual opponent may be a simulation that is derived from the statistical distributions used to construct the bubble plots. In this manner, the user 12 may initially specify the average or handicap of a virtual golfer that he or she wishes to challenge (alternatively, the system 10 may pre-select a virtual golfer with a similar or marginally better average/handicap). The system 10 may then simulate the performance of that virtual golfer on a hole-by-hole basis for the chosen course. This simulation may use similar probability distributions to those used for constructing the bubble plots 130 for generating hole-by-hole scores according to a probabilistic model. Examples of ability metrics that may be used in the model include for metrics such as fairways hit, scrambling percentage, greens in regulation, total puts, and/or scores relative to par for the given hole difficulty, length, and/or par. As with any of the challenges 106, the scores of the virtual playing partner would be populated into an electronic scorecard of the user 12 after the completion of each hole.

In addition to maintaining the actual course layout data, the server 14 may further maintain one or more virtual leaderboards or rankings on a course-by-course basis (e.g., via the golf course data 28). These virtual leaderboards may be indexed to the user account data 26 to provide identities of those who hold top spots, and may be indexed to user play data 30 to reference the scores and date when the round was played. In this manner, the leaderboards may be capable of being filtered by recency of play (e.g., past week, month, year, all-time), and a user's actual round performance may be ranked either raw terms, or as a percentile against performances within the given date filter. Additionally, following the completion of any round, the server 14 examine existing leaderboards and/or recompute all available challenges so that the listing may be quickly accessed at the start of a new round.

Referring back to the social media aspect of the present system 10, following the completion of a challenge or accomplishment of a particular achievement (e.g., streak of birdies, bogey or better, par or better, hit all fairways, play on a number of different courses or rounds, etc), the user 12 may push a notification out to his/her social network 58, where the notification may be viewed, for example, on an active news feed. Additionally, a user 12 may enter or tag one or more pieces of equipment, which may also be shared with the network 58.

In a further embodiment, rather than a user 12 having to manually enter score data, the system 10 may be configured to automatically track and log a user's performance. To accomplish this, the system 10 may attempt to record the position and occurrence of each shot using, for example, the GPS receiver 46 and some means of a user input, such as the digitizer 52 or accelerometer associated with either the client device 16 or a linked smart-watch. More specifically, when the user 12 addresses his or her ball to take a stroke, the user 12 may provide some means of input to indicate to the client device 16 that a shot is about to commence. This input may include, for example, tapping a screen of the smart phone or smart watch or shaking the smart phone/smart watch in a particular manner or for a particular duration, which may be detected by a motion tracking accelerometer.

Once the client device 16 receives the indication from the user 12 that a shot is about to commence, it may poll and log the GPS location data at that moment. The client device 16 may then analyze the GPS data to determine the relative location of the user 12, and may use the indication of an immanent stroke to increment the user's score. In one embodiment, the client device 16 may directly compare the GPS location with one or more geocoded course boundaries (e.g., edge of the fairway or boarder of the green), which may be downloaded from the server course data 28, to better understand the user's lie and/or which hole to assign the incremented stroke to. In an embodiment where the course data 28 does not contain specific boundary data, the GPS position may be initially located within a downloaded image of the hole, such as shown in FIG. 8. The client device 16 may then use image analysis techniques to determine and extract boundaries between fairway and rough, or between the green, rough, and/or fairway. Once the boundaries are extracted from the image, the user's location may be further analyzed to determine the lie and/or which hole to assign the incremented stroke to.

In a further embodiment, the client device 16 and/or smart watch may provide the user 12 with an ability to indicate which club is being used prior to marking the shot at address. Upon marking the next shot, the client device 16 may determine a distance and/or accuracy metric for the club used in the previous shot (i.e., by determining the distance between the two recorded GPS locations and/or by comparing the second GPS location with a line drawn down the center of the fairway). The system 10 may aggregate the determined shot statistics on a club-by-club basis and compute one or more statistical distributions for distance and/or accuracy (i.e., "club statistics"). These club statistics may then be provided to the user 12 to illustrate certain hitting tendencies, or may be used to provide customized pro-tips (e.g., drills or techniques to reduce shot distributions/scatter), or to suggest product improvements (i.e., to gap-fit existing clubs, suggest more accommodating products, or custom fit new clubs).

In general, the present system 10 leverages the existence of a broad network of users to provide a given user with an enhanced golf experience and the ability to make customized game improvement tips based on comparisons between the user's personal ability metrics and statistical distributions that are constructed across all users of a similar average or handicap.

"A," "an," "the," "at least one," and "one or more" are used interchangeably to indicate that at least one of the item is present; a plurality of such items may be present unless the context clearly indicates otherwise. The terms "comprises," "comprising," "including," and "having," are inclusive and therefore specify the presence of stated items, but do not preclude the presence of other items. As used in this specification, the term "or" includes any and all combinations of one or more of the listed items and can properly be read as "and/or" even if not explicitly stated as such. When the terms first, second, third, etc. are used to differentiate various items from each other, these designations are merely for convenience and do not limit the items.

The invention claimed is:

1. A computer-implemented method for analyzing sport performance metrics and providing training feedback, comprising:

receiving, at a server, play data for a plurality of users participating in a sporting activity, the play data including performance metrics for each user;

determining, by the server, a statistical distribution of the performance metrics categorized by an ability level of each user;

receiving, from a client device associated with a first user, data indicating participation of the first user in the sporting activity;

determining, by the server, a performance metric for the first user based on the received data;

comparing, by the server, the performance metric of the first user to the statistical distribution of performance metrics of other users having a similar ability level as the first user;

identifying, by the server, a deficient performance metric of the first user based on the comparison to the statistical distribution; and transmitting, to the client device, a training program configured to improve the deficient performance metric.

2. The computer-implemented method of claim 1, wherein receiving play data comprises receiving play data from client devices associated with the plurality of users over a network.

3. The computer-implemented method of claim 1, wherein determining a statistical distribution comprises determining separate statistical distributions categorized by a plurality of ability level ranges.

4. The computer-implemented method of claim 1, wherein the ability level comprises an average score or handicap of each user.

5. The computer-implemented method of claim 1, wherein determining a performance metric comprises determining one or more of: a number of fairways hit, a number of greens hit in regulation, a scrambling percentage, a number of putts per hole, a percentage of one putts, or a percentage of up and down conversions.

6. The computer-implemented method of claim 1, further comprising:
identifying a target ability level for the first user;
comparing the performance metric of the first user to a statistical distribution of performance metrics of other users having the target ability level;
identifying a performance metric of the first user that is deficient compared to the statistical distribution of users with the target ability level; and
generating the training program to target improvement of the identified deficient performance metric.

7. The computer-implemented method of claim 1, further comprising:
aggregating performance metrics and play data from a plurality of users over time; determining statistical distributions of performance metrics across ability levels; and periodically updating the determined statistical distributions.

8. The computer-implemented method of claim 7, further comprising normalizing the aggregated performance metrics based on difficulty ratings of golf holes on which the performance metrics were obtained.

9. The computer-implemented method of claim 1, wherein identifying a deficient performance metric further comprises comparing the performance metrics of the user to performance metrics for golfers of a similar ability level.

10. The computer-implemented method of claim 1, wherein transmitting a training program comprises providing customized pro tips, training tips, exercises, or drills corresponding to improving determined golf skills related to the identified deficient performance metrics.

11. The computer-implemented method of claim 1, wherein receiving play data comprises receiving data including yardages, number of strokes, number of putts, penalty strokes, or an identifier indicating a golf club used.

12. The computer-implemented method of claim 1, wherein determining a statistical distribution comprises categorizing distributions by a plurality of ability level ranges based on average score or handicap.

13. The computer-implemented method of claim 1, wherein the sporting activity is golf.

14. A server system for analyzing sport performance metrics and providing training feedback, the system comprising:
one or more processors;
a memory storing user data, course data, user performance metrics, and computer-readable instructions that, when executed by the one or more processors, cause the server system to:
receive play data for a plurality of users participating in a sporting activity, the play data including performance metrics for each user;
determine a statistical distribution of the performance metrics categorized by an ability level of each user;
receive, from a client device associated with a first user, data indicating participation of the first user in the sporting activity;
determine a performance metric for the first user based on the received data;
compare the performance metric of the first user to the statistical distribution of performance metrics of other users having a similar ability level as the first user;
identify a deficient performance metric of the first user based on the comparison to the statistical distribution; and
transmit, to the client device, a training program configured to improve the deficient performance metric.

15. The system of claim 1, wherein receiving play data comprises receiving play data from client devices associated with the plurality of users over a network.

16. The system of claim 1, wherein determining a statistical distribution comprises determining separate statistical distributions categorized by a plurality of ability level ranges.

17. The system of claim 1, wherein determining a performance metric comprises determining one or more of: a number of fairways hit, a number of greens hit in regulation, a scrambling percentage, a number of putts per hole, a percentage of one putts, or a percentage of up and down conversions.

18. The system of claim 1, wherein the memory further stores instructions to:
identify a target ability level for the first user;
compare the performance metric of the first user to a statistical distribution of performance metrics of other users having the target ability level;
identify a performance metric of the first user that is deficient compared to the statistical distribution of users with the target ability level; and
generate the training program to target improvement of the identified deficient performance metric.

19. The system of claim 1, wherein the memory further stores instructions to:
aggregate performance metrics and play data from a plurality of users over time;
determine statistical distributions of performance metrics across ability levels; and
periodically update the determined statistical distributions.

20. The system of claim 1, wherein transmitting a training program comprises providing customized pro tips, training tips, exercises, or drills corresponding to improving determined golf skills related to the identified deficient performance metrics.

* * * * *